United States Patent [19]
Reese et al.

[11] Patent Number: 4,826,467
[45] Date of Patent: May 2, 1989

[54] DRIVE MECHANISM FOR A CONTINUOUSLY VARIABLE TRANSMISSION

[75] Inventors: Terry L. Reese, Grovetown; James R. Kerlin, Evans, both of Ga.

[73] Assignee: Club Car, Augusta, Ga.

[21] Appl. No.: 218,158

[22] Filed: Jul. 13, 1988

[51] Int. Cl.⁴ ............................................. F16H 11/06
[52] U.S. Cl. ....................................................... 474/14
[58] Field of Search ................................. 474/11–15, 474/69, 70

[56] References Cited

U.S. PATENT DOCUMENTS

| | | | |
|---|---|---|---|
| 1,870,647 | 8/1932 | Rawson | 192/105 C |
| 1,929,118 | 10/1933 | Nakashian | 192/105 |
| 1,931,675 | 10/1933 | Nutt | 192/105 |
| 2,479,764 | 8/1949 | Morton et al. | 264/15 |
| 3,648,532 | 3/1972 | Vallieres | 474/14 |
| 3,733,918 | 5/1973 | Domaas | 474/14 X |
| 3,759,111 | 9/1973 | Hoff | 474/14 |
| 3,939,720 | 2/1976 | Aaen et al. | 474/14 |
| 3,962,928 | 6/1976 | Beaudoin et al. | 474/14 X |
| 4,027,544 | 6/1977 | Kobayashi | 474/14 X |
| 4,051,739 | 10/1977 | Takagi et al. | 474/14 |
| 4,052,908 | 10/1977 | Takagi et al. | 474/14 |
| 4,095,479 | 6/1978 | Lundberg | 474/12 |
| 4,464,144 | 8/1984 | Kobayashi | 474/14 |
| 4,493,221 | 1/1985 | Stieg et al. | 474/14 |
| 4,575,363 | 3/1986 | Burgess et al. | 474/14 |

Primary Examiner—Thuy M. Bui
Attorney, Agent, or Firm—Laurence R. Brown; Alfred J. Mangels

[57] ABSTRACT

A continuously variable power transmission including a driving pulley and a driven pulley that each include a fixed face and a movable face, the movable face being movable in a direction toward and away from the fixed face to vary the effective driving radius of the respective pulleys and thereby vary the drive ratio. The movable face of the driving pulley is actuated by a centrifugal weight assembly including a primary weight and a secondary weight each mounted on a common pivot axis. The primary and secondary weights are adapted to rotate together during a low speed range of operation of the driving pulley and the primary weight operates alone have a predetermined driving pulley speed, in order to permit rapid response to increased torque requirements at high driving pulley speeds. The driving pulley includes a rolling contact bearing between the fixed and movable faces to prevent relative sliding movement between the drive belt and the drive shaft, to eliminate belt squealing when the driven pulley is rotating and the drive pulley is at rest, as for example during downhill coasting of a vehicle having a belt drive power transmission.

19 Claims, 3 Drawing Sheets

DRIVE MECHANISM FOR A CONTINUOUSLY VARIABLE TRANSMISSION

BACKGROUND OF THE INVENTION

1. Field of the Invention

This invention relates to belt-type power transmissions for vehicles of various types, and more particularly to a variable width driving pulley for a continuously variable transmission that uses a belt for transmitting power from an engine to a drive wheel of a vehicle.

2. Description of the Related Art

Continuously variable power transmissions utilizing a V-belt and pulley drive system for transferring power from a driving pulley to a driven pulley are well known. In such systems a driving pulley, connected with the output shaft of an engine, and a driven pulley, connected with the drive wheel of a vehicle, are each made to include a fixed pulley wall and a movable pulley wall, with the spacing between the respective pulley walls determining the drive ratio from the engine to the drive wheel. An example of such a transmission system is shown and described in U.S. Pat. No. 4,493,221, which issued Jan. 15, 1985, to Richard F. Stieg et al.

Generally, such transmissions are used as a part of the drive system of such devices as snowmobiles, automobiles, golf cars, utility vehicles, and the like. When in use in such vehicles, it is desirable that the transmission provide rapid response to a demand for acceleration, both upon initial startup from a rest position, as well as while the vehicle is moving and a demand arises for additional torque to increase or to maintain the speed of the vehicle as, for example, during a climb up a hill or other inclined surface. Heretofore, such belt-type, continuously variable transmissions have been characterized by relatively slow response to such increased torque requirements, and it is therefore an object of the present invention to provide a driving pulley for a continuously variable transmission in which the response to increased torque requirements at normal and high operating speeds is more rapid than in conventional devices of that type.

Another object of the present invention is to provide a driving pulley for a continuously variable transmission wherein the pulley provides increased responsiveness both at initial take-off of the vehicle, as well as at higher, cruise speed conditions.

SUMMARY OF THE INVENTION

Briefly stated, in accordance with one aspect of the present invention, a drive pulley is provided for a belt-type, variable speed power transmission. The pulley includes a drive shaft to receive power from a power source, and a first pulley wall that is fixed in its axial position relative to the drive shaft so that it is driven by the power source through the drive shaft. A second pulley wall is provided that is coaxial with, adjacent to, and spaced from the first pulley wall, and is movable axially toward and away from the first pulley wall to provide a drive pulley having a variable width to provide an infinitely variable driving radius between its maximum and minimum positions.

The position of the second pulley wall relative to the first pulley wall is defined by a centrifugally-operated weight system that bears against and causes axial movement of the second pulley wall relative to the first pulley wall. The weight system includes a plurality of weight assemblies positioned outwardly of the axis of the drive shaft, and each of the weight assemblies is capable of pivotal movement about a pivot axis that is spaced radially outwardly of the axis of the drive shaft. The weight assembly includes a pair of weights that are pivotable about the pivot axis and include a primary weight and a secondary weight. The primary weight is adapted for pivotal movement about the pivot axis throughout the entire rotational speed range of the driving pulley, whereas the secondary weight is adapted for pivotal movement about the pivot axis over a range of speeds that extends from initial pulley rotation to a speed less than a predetermined engine operating speed, whereby the secondary weight operates only during a limited, lower speed portion of the speed range of the driving pulley. The primary and secondary weights are interconnected to rotate together centrifugally over a lower portion of the speed range of the power source.

DESCRIPTION OF THE PREFERRED EMBODIMENTS

Figure 1:
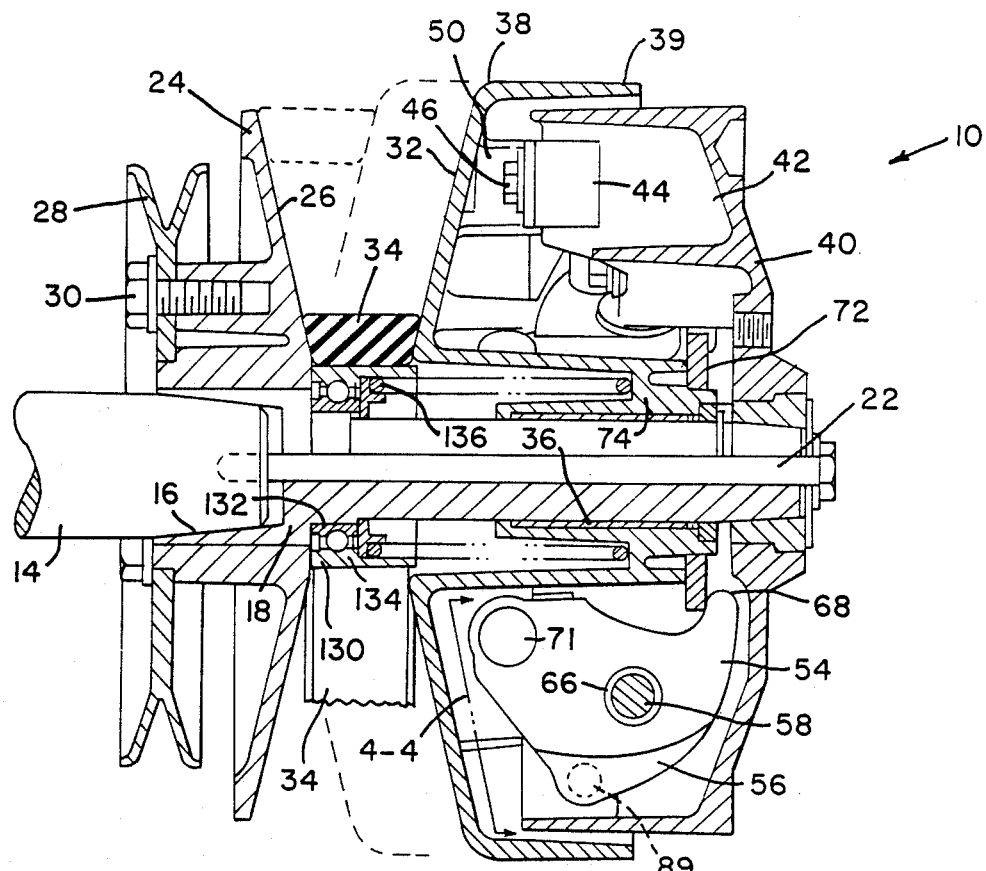
FIG. 1 is a longitudinal, cross-sectional view of a driving pulley in accordance with the present invention.
Figure 2:
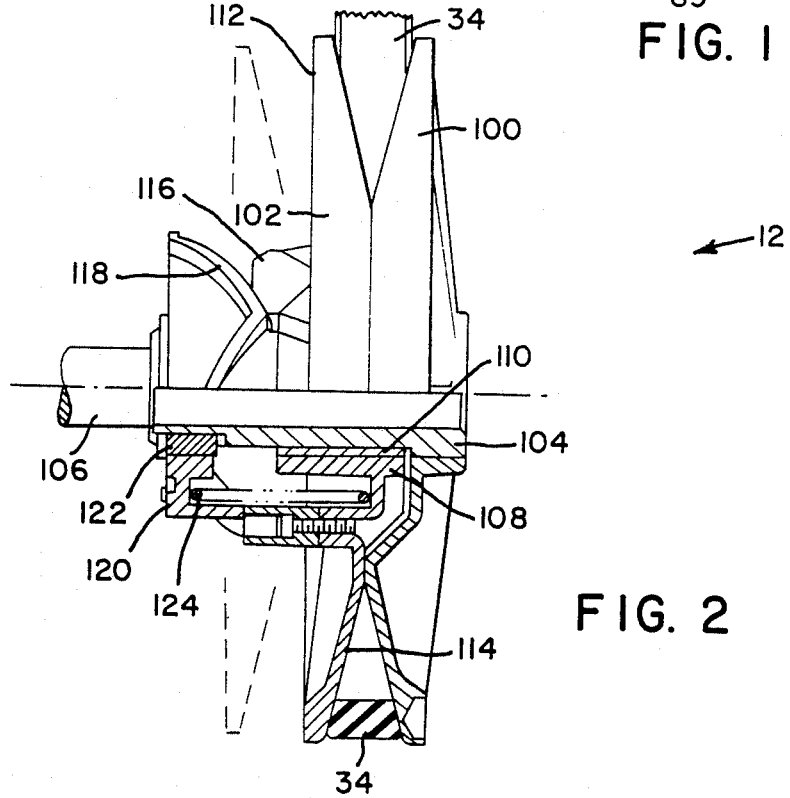
FIG. 2 is a longitudinal view, in quarter-section, of a driven pulley, which, together with the driving pulley and belt shown in FIG. 1, constitutes a continuously variable power transmission in accordance with the present invention.

Referring now to the drawings, and particularly to FIGS. 1 and 2 thereof, there is shown a driving pulley 10 and a driven pulley 12 forming part of a continuously variable, belt-type power transmission. Driving pulley 10 is adapted to be connected to a source of power (not shown) that provides power through an input power shaft 14 that extends into and is drivingly received in the bore 16 of a pulley drive shaft 18 that includes a standard morse taper, or the like. Power shaft 14 is drivingly connected with pulley drive shaft 18 by means of a connecting bolt 22 that extends axially through the pulley drive shaft 18 and is threadedly received in the tapered outer end of power shaft 14.

Surrounding pulley drive shaft 18 and drivingly connected therewith is a fixed pulley wall 24 that includes a frustoconical contact surface 26 that is inclined relative to the axis of pulley drive shaft 18 and that defines one belt-contacting wall of driving pulley 10. Surface 26 is fixed relative to the axis of the pulley drive shaft 18 and is therefore hereinafter referred to as the fixed pulley face. Connected with fixed pulley wall 24 on the side opposite from belt-contacting surface 26 is a fixed V-belt pulley 28 that is secured to the fixed pulley wall by means of bolts 30, or the like. Fixed pulley 28 is adapted to receive a V-belt (not shown) that transmits starting torque from a starter-generator combination (not shown) that is used to initially start a gasoline engine that can be used to provide power to driving pulley 10. After the engine is started, fixed pulley 28 serves as a power take-off to drive the starter-generator after it has left the starter mode and has entered the generator mode, in order to provide charging energy to charge a starting battery (not shown).

Facing fixed pulley wall 24 and spaced axially therefrom, is a movable pulley wall 38 that also includes a frustoconical belt-contacting surface 32 that is inclined relative to the axis of pulley drive shaft 18. Movable pulley surface 32 and fixed pulley surface 26 are inclined in opposite directions relative to pulley drive shaft 18 to define a V-shaped annular slot to receive a V-belt 34. Movable pulley surface 32 is coaxial with fixed pulley surface 26 and is movable in an axial direction toward and away from fixed pulley surface 26, as will hereinafter be described in more detail. Movable pulley wall 38 is rotationally and axially slidably received on drive shaft 18 and includes a suitable sleeve bearing 36, or the like, to surround drive shaft 18 and permit sliding movement relative thereto. Additionally, movable pulley wall 38 includes an axially extending flange 39 to define a bowl-shaped, hollow inner portion to receive a driving mechanism that will be hereinafter described in more detail.

Spaced axially outwardly from movable pulley wall 38 and in facing relationship with the bowl-shaped interior portion thereof is a drive hub 40 of generally U-shaped cross section, to define a bowl-shaped portion that faces the bowl-shaped portion of movable pulley wall 38. Drive hub 40 is secured to drive shaft 18 to rotate therewith and is adapted to fit partially within the bowl-shaped interior portion of movable pulley wall 38.

A plurality of drive arms 42 (see FIG. 3) extend radially and axially from the interior surface of drive hub 40 and extend in a substantially radial direction relative to the axis of drive shaft 18. Drive arms 42 each include a drive button 44 facing movable pulley wall 38, and drive buttons 44 are of generally U-shaped construction and are secured on drive arms 42 by means of bolts 46, or the like. A drive button spring 48 is positioned between drive buttons 44 and drive arms 42 to reduce the tendency of the drive buttons to rattle with respect to the drive arms. Preferably, three equidistantly radially spaced drive arms are provided, although fewer or more such arms can be provided if desired.

Movable pulley wall 38 includes a corresponding number of similarly positioned drive sockets 50 that extend axially toward drive hub 40 so that they can be contacted by a respective drive button 44. Preferably, drive sockets 50 are formed integrally with movable pulley wall 38 so that the latter can be positively driven by drive hub 40 through the drive buttons and the respective drive arms.

Figure 3:
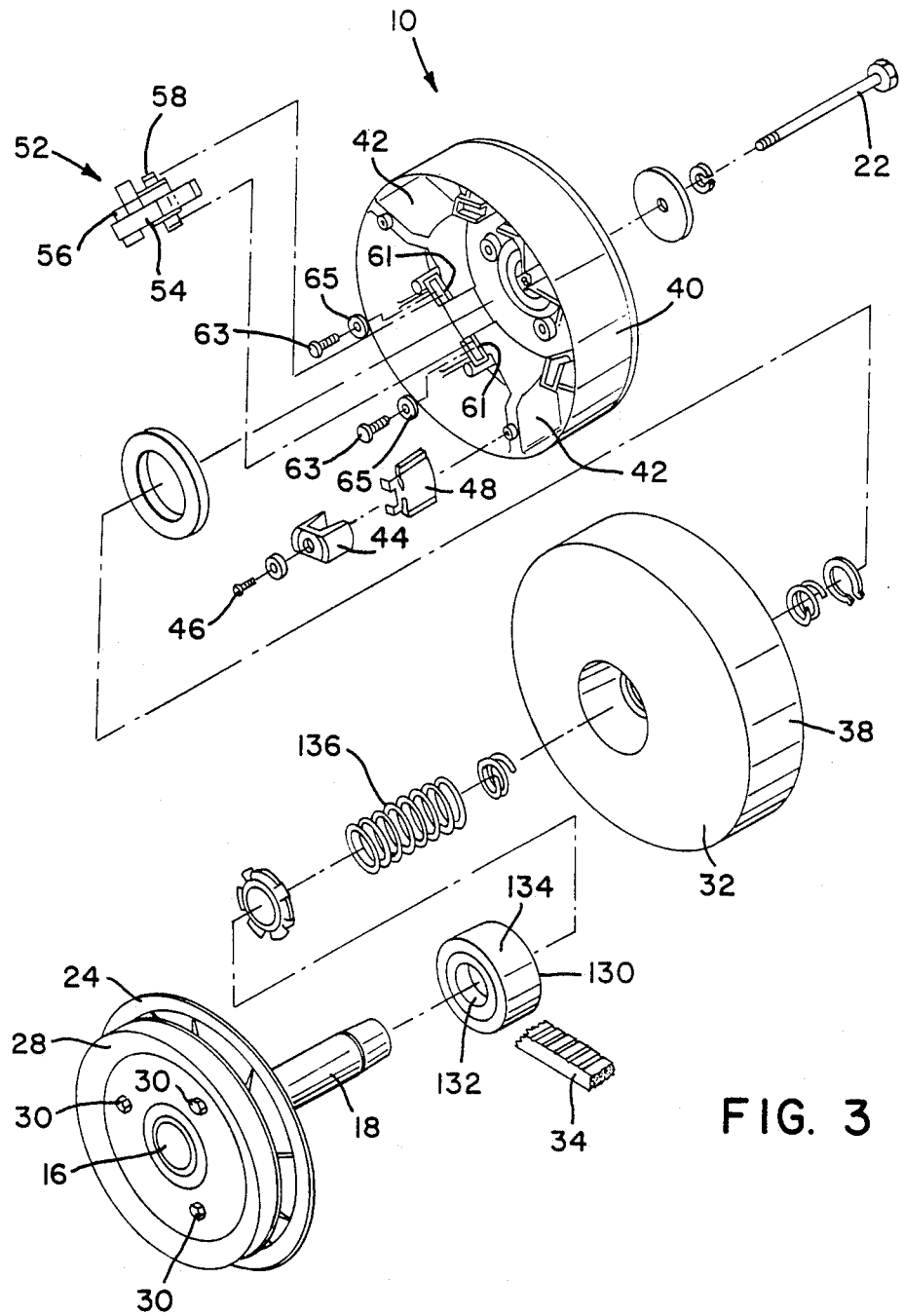
FIG. 3 is an exploded view of the driving pulley shown in FIG. 1.
Figure 4:
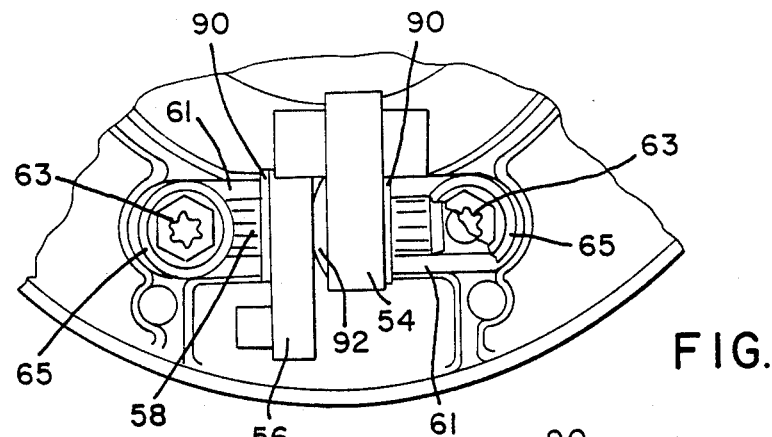
FIG. 4 is an enlarged, fragmentary, transverse view of the weight system within the driving pulley and taken along the line 4—4 of FIG. 1.

Also positioned within drive hub 40 are a plurality of weight assemblies 52, including a primary weight 54 and a secondary weight 56. Each of weight assemblies 52 is pivotally carried on a respective pivot shaft 58 that is oriented so that its axis is tangent to a circle having a predetermined radius and having its center on the axis of drive shaft 18. As shown in FIGS. 3 and 4, pivot shaft 58 is received in a pair of spaced, curved bosses 61 and is non-rotatably secured therein by bolts 63 and washers 65 that bear against the outer diameter of pivot shaft 58 and retain it in position against bosses 61.

Figure 5:
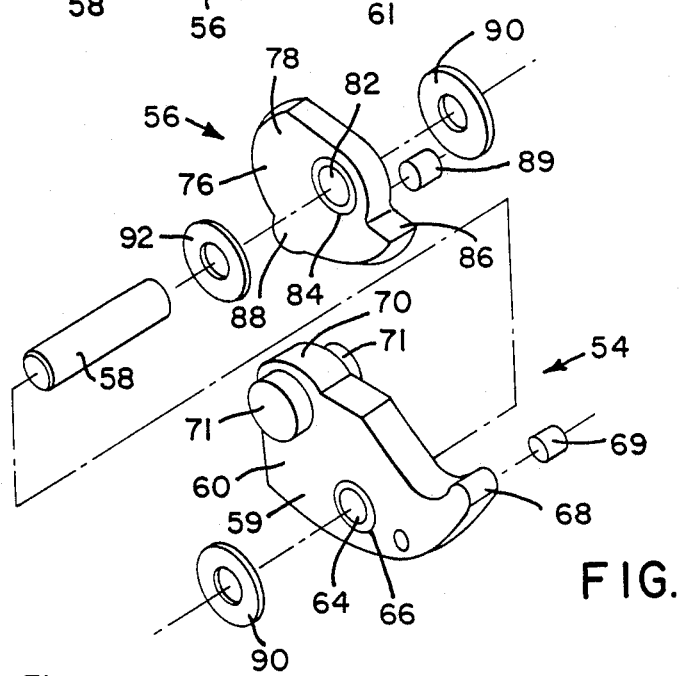
FIG. 5 is an exploded side view of the weights constituting the weight system shown in FIGS. 1 and 4.
Figure 6:
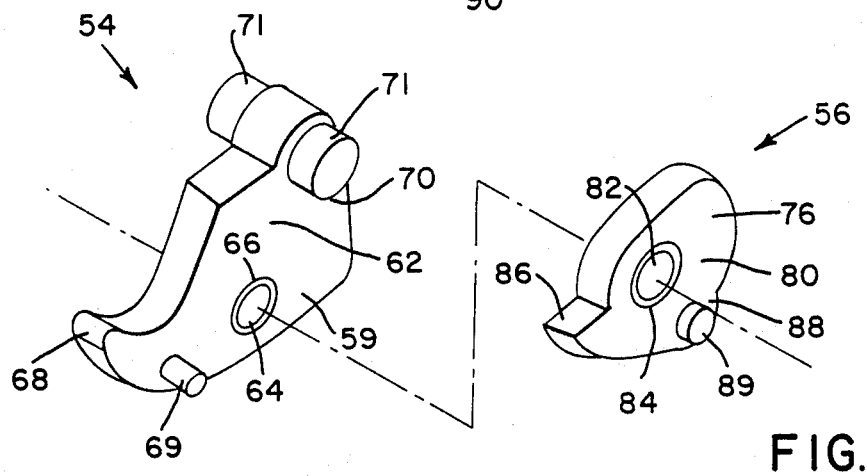
FIG. 6 is another exploded side view of the weights constituting the weight system, viewed from the opposite side of the weights from the side shown in FIG. 5.

As best seen in FIGS. 5 and 6, primary weight 54 includes a substantially flat, elongated body portion 59 that is defined by two spaced, flat sides 60 and 62, between which a through bore 64 extends that carries a sleeve bearing 66. Pivot shaft 58 passes through bearing 66 to permit primary weight 54 to pivot thereabout. At one end of elongated body portion 59 is a driving lip portion 68 and at the opposite end of body portion 59 is a weight portion 70, each of which portions is positioned on opposite sides of the axis of pivot shaft 58. Weight portion 70 can include one or more weights 71 that can extend outwardly from sides 60 and 62, as shown.

Positioned between driving lip 68 and bearing 66 is a drive pin 69 that extends outwardly from side 62 in a substantially perpendicular direction. Driving lip portion 68 is adapted to engage with a thrust surface 72 (see FIG. 1) that is adjacent a center sleeve 74 connected with movable pulley surface 32 so that when primary weight 54 pivots in a counterclockwise direction, as viewed in FIG. 1, driving lip portion 68 bears against thrust surface 72 and causes movable pulley surface 32 to move to the left, as viewed in FIG. 1, to reduce the effective pulley width, and consequently to increase the effective drive radius of driving pulley 10.

Referring once again to FIGS. 5 and 6, secondary weight 56 also has a flat body portion 76, defined by spaced flat sides 78 and 80, and a through bore 82 extends between sides 78 and 80 and carries a sleeve bearing 84. Pivot shaft 58 passes through bearing 84 to permit secondary weight 56 to pivot thereabout, and body portion 76 includes a contact surface 86 and a weight portion 88, each of which is positioned on opposite sides of the axis of pivot shaft 58. Weight portion 88 can include an outwardly extending weight 89, that extends substantially perpendicularly from side 80. The weight portions 70 and 88 of the respective weights 54 and 56 are of such a weight that the centers of mass of each of weights 54 and 56 lie on the same side of the axis of pivot shaft 58, relative to a plane passing through the axis of pivot shaft 58 and perpendicular to the axis of drive shaft 18, when drive shaft 18 is at rest.

Referring to FIGS. 4 through 6, contact surface 86 of secondary weight 56 extends substantially radially relative to the axis of pivot shaft 58, and is adapted to contact drive pin 69 that extends outwardly from primary weight 54. Secondary weight 56 is adapted to pivot with primary weight 54 up to a predetermined rotational speed of drive shaft 18, at and above which speed the center of mass of secondary weight 56 is located on a plane that passes through the axis of pivot shaft 58 and is perpendicular to the axis of drive shaft, causing secondary weight 56 to remain in a predetermined position, even if the speed of drive shaft 18 is increased further, while primary weight 54 can continue to pivot.

The respective weights are shown in their initial position in FIG. 1. When the device is assembled and the weights are positioned relative to each other as illustrated in FIGS. 1 and 4, contact surface 86 on secondary weight 56 is in contact with drive pin 69 of primary weight 54, and thus rotation of drive shaft 18 from a zero speed condition to an operating speed condition will cause both the primary weight and the secondary weight pivot together about the axis of pivot shaft 58 by virtue of the relative positions of their respective centers of mass. When the secondary weight has reached the position wherein its associated center of mass is at its radially outermost position, relative to the drive shaft axis, the secondary weight stops its pivotal movement, and a further increase in the rotational speed of the drive shaft will not affect the position of the secondary weight, whereas the primary weight can continue to pivot be virtue of the position of the primary weight center of mass relative to the axis of pivot shaft 58.

A pair of antifriction washers 90 carried by pivot shaft 58 are provided on the outer sides of each of weights 54 and 56. Additionally, a concave washer 92, which can be in the form of a wave washer or a belleville spring, is carried by pivot shaft 58 between the respective weights, with the concave side facing the primary weight 54.

Referring now to FIG. 2, driven pulley 12 has a configuration similar to that of driving pulley 10 in that it includes a fixed face portion 100 and a movable face portion 102, the spacing between which determines the effective driving radius of belt 34 that is adapted to be received in the V-shaped groove defined between the respective fixed and movable faces. Fixed face 100 is secured to driven sleeve 104, which can be drivingly connected with a driven shaft 106, such as by means of a key (not shown) or the like.

Movable face 102 includes a central sleeve 108 that carries a sleeve bearing 110 to permit both axial and rotational movement of the movable face relative to driven sleeve 104. Positioned on the outer surface 112 of movable face 102, opposite to the belt-contacting surface 114, is a drive member 116, which preferably includes three equidistantly circumferentially spaced drive buttons that are positioned at a predetermined radius from the axis of driven sleeve 104.

Positioned opposite drive member 116 are a plurality of circumferentially spaced, fixed helical cams 118, equal in number to the number of drive buttons, and are carried on a hub 120 that is keyed to driven sleeve 104 by means of a key 122, or the like. Extending between hub 120 and central sleeve 108 is a torsion-compression spring 124 that has one end thereof fixed to central sleeve 108, and has the other end fixed to hub 120. The construction and operation of the driven pulley is substantially similar to known devices of that type and are familiar to those skilled in the art.

Referring once again to FIGS. 1 and 3, positioned between fixed pulley surface 26 and movable pulley surface 32 is a rolling- contact-type idler bearing 130 that is concentric with the axis of drive shaft 18, and that includes an inner race 132 carried by drive shaft 18 and an outer race 134 that is rotatably supported relative to the inner race by a plurality of rotatable balls, or the like. As shown in FIG. 1, outer race 134 has a substantially greater axial length than does inner race 132, and it serves to support drive belt 34 when movable pulley surface 32 is at its most distant spacing from fixed pulley surface 26. Positioned between bearing 130 and center sleeve 74 of movable pulley surface 32 is a compression spring 136 that is adapted to hold movable pulley surface 32 away from fixed pulley surface 26.

The overall structure of driving pulley 10 is illustrated in FIG. 3 in exploded form, and shows a number of the respective parts thereof more clearly than FIG. 1. The relative positions of the weights are also illustrated in the enlarged view of FIG. 4 and the exploded views of FIGS. 5 and 6.

In operation, and referring initially to FIGS. 1 and 2, the respective faces of the driving and driven pulleys are shown in full lines in their initial position, at which time the drive shaft is either stopped or is at an idle speed condition, which is a relatively low rotational speed. At that condition the drive belt is at its innermost radial position in the drive pulley, and the innermost surface of the drive belt rides against the idler bearing. At the same time, the drive belt is at its radially outermost position relative to the driven pulley, and because at the idle speed condition the drive belt is not in firm frictional contact with the fixed pulley wall of the driving pulley, no driving force is applied to the belt, and both the belt and the driven shaft are in a stationary condition.

As the engine speed increases above the idle speed, the centrifugal force acting on the respective primary and secondary weights as a consequence of that increased speed causes the weights to pivot in a counterclockwise direction, as viewed in FIG. 1, and that pivotal movement takes place with the primary and secondary weights moving together, and with the contact surface of the secondary weight in contact with the drive pin of the primary weight. Thus, initially, the two weights move together, and consequently there is a relatively large pivotal mass provided by the combination of the effects of the two weights during a start-up condition. Thus, the weight arrangement herein shown and described provides a relatively high initial driving torque by virtue of the combined effects of the primary and secondary weights. As the engine speed increases further, and as the weights continue to pivot in the counterclockwise direction as viewed in FIG. 1, the primary weight driving lip acts against the thrust surface of the movable pulley wall, which thrust surface can be a thrust washer, or the like, and causes the movable pulley wall to move toward the left, as viewed in FIG. 1, to narrow the spacing between the fixed pulley wall and the movable pulley wall. As a result, the drive belt is caused to ride upwardly in the V-shaped slot defined between the two walls, at a greater radial distance from the drive shaft axis, and the pulley faces in contact with the drive belt thereby cause the belt to be driven. Consequently, the driven pulley is driven by the drive belt and drives the driven or output shaft.

When the engine rotational speed, and that of the drive shaft, is relatively low, but above idle speed, the drive belt will ride in the driven pulley at some intermediate position radially outwardly of the driven shaft axis, and, correspondingly, as the drive belt moves radially inwardly in the driven pulley, it causes the movable face of the driven pulley to move away from the fixed face and thereby imparts a greater rotational speed to the driven shaft. A further increase in the rotational speed of the engine to its predetermined maximum speed will cause the parts to assume the dashed line positions as shown in each of FIGS. 1 and 2, whereupon the driven shaft will be driven at its maximum rotational speed.

When the vehicle is traveling along a level surface, the driving pulleys and driven pulleys will adjust to provide the necessary driving torque, dependent upon the engine speed and vehicle loading. However, when the vehicle experiences an incline, at which time increased torque is demanded by the driven pulley to move the vehicle up the incline, the increase in demanded torque of the driven shaft will increase the pull of the drive belt on the driven pulley, thereby causing the movable face to rotate in the direction of the drive belt, relative to the fixed face, and will cause the drive buttons on the movable face to rotate relative to the fixed face and to slide on the helical cam surface to force the movable face to move toward the fixed face, thereby causing the drive belt to ride within the driven pulley at a greater radial distance, relative to the driven shaft, and at the same time causes the belt to ride at a smaller radial distance in the driving pulley, relative to the drive shaft of the driving pulley, to counteract the effect of the centrifugal weights carried by the drive hub, to force the weights clockwise to a retracted position, as shown in FIG. 1. As a consequence, the effective drive radius of the driving pulley is decreased, thereby providing an increase in the drive ratio between the driving pulley and the driven pulley, and a consequently higher torque at the wheels of the vehicle. Because the centrifugal mass to be overcome above a predetermined speed is provided solely by the primary weight, and because the mass of the primary weight is less than the combined masses of the primary and secondary weights, the response to a demand for increased torque at a high speed condition is more rapid than if the primary and secondary weights together were required to be overcome by the inward movement of the belt relative to the driving pulley. Thus, the present invention provides a much more rapid response to an increased torque requirement at high speeds, as compared with the prior art devices in which combinations of large weights operate in the high speed portion of the spectrum, and the effects of the larger masses must be overcome, thereby resulting in slower response to an increased torque requirement.

When the vehicle is coasting, such as in a downhill direction, when the engine speed is zero, the driving pulley has assumed the position shown in full lines in FIG. 1, and the drive belt consequently rides on the idler bearing. However, because the idler bearing permits rotation of the outer race along with the belt, there is no relative slipping movement between the belt and the idler bearing, thus eliminating the belt squeal that could otherwise occur when coasting downhill, wherein the rapidly moving drive belt slides over a slowly rotating or non-rotating shaft, and because of the relative sliding movement therebetween an annoying belt squeal occurs. The present invention eliminates such undesirable squealing noises.

It can thus be seen that the present invention provides distinct improvements over the prior art devices, in that it permits more rapid uphill acceleration of a vehicle by virtue of improved responsiveness resulting from the lower centrifugal weight that must be overcome at cruising speed as compared with prior art devices, and, at the same time, the idler bearing prevents undesirable belt squeal in a coasting mode.

Although particular embodiments of the invention have been illustrated and described it will be apparent to those skilled in the art that various changes and ;modifications can be made without departing from the spirit of the present invention. Accordingly, it is intended to encompass within the appended claims all such changes and modifications that fall within the scope of the present invention.

What is claimed is:

1. A drive pulley for a belt-type, variable speed power transmission, said drive pulley comprising:
   a. a drive shaft adapted for connection with a source of rotational power;
   b. a first pulley wall coaxial with and drivingly connected with the drive shaft to rotate therewith, the first pulley wall including a first pulley surface inclined to the drive shaft axis for drivingly engaging a first side of a drive belt;
   c. a second pulley wall adjacent to and coaxial with the first pulley wall and movable axially along the drive shaft axis toward and away from the first pulley wall, the second pulley wall having a second pulley surface inclined to the axis of the drive shaft for drivingly engaging a second side of a drive belt, the second pulley surface facing the first pulley surface to define a pair of drive-belt-engaging pulley wall surfaces that diverge outwardly from the drive shaft axis, the drive shaft carrying actuating means for moving the second pulley wall axially relative to the first pulley wall in response to centrifugal forces induced during rotation of the drive shaft, the actuating means including primary and secondary weights configured to permit joint movement of the weights from a predetermined first, low speed, to a predetermined second, speed higher than the first speed, and to permit continued rotation of only one of the weights at speeds above the second speed; and
   d. drive means extending between the drive shaft and the second pulley wall for rotating the second pulley wall about the drive shaft axis.

2. A drive pulley in accordance with claim 1, wherein the primary and secondary weights are pivotally carried on a common pivot axis spaced radially outwardly of the drive shaft axis.

3. A drive pulley in accordance with claim 2, wherein the pivot axis extends tangentially to a circle of predetermined radius having its center on the axis of the drive shaft.

4. A drive pulley in accordance with the claim 2, wherein the primary and secondary weights pivot in response to centrifugal forces to move the second pulley wall axially toward the first pulley wall.

5. A drive pulley in accordance with claim 4, wherein the actuating means includes spring means acting on the second pulley wall for biasing the second pulley wall axially away from the first pulley wall.

6. A drive pulley in accordance with claim 2, wherein the primary weight and the secondary weight are in closely spaced relationship on the pivot axis, and wherein separating means is positioned between and in contact with each of the primary weight and the secondary weight.

7. A drive pulley in accordance with claim 6, wherein the secondary weight includes a secondary weight lobe positioned on an opposite side of the secondary weight from the side adjacent the primary weight.

8. A drive pulley in accordance with claim 1, wherein the primary and secondary weights each pivot about the pivot axis and include engagement means for pivoting the primary and secondary weights together at low drive shaft speeds, the engagement means disengaging above a predetermined high drive shaft speed to permit the primary weight to continue to pivot about the pivot axis while the secondary weight is disengaged therefrom.

9. A drive pulley in accordance with claim 8, including thrust washer means carried by the second pulley wall, wherein the primary weight includes a driving lip spaced radially outwardly from the pivot axis and engageable with the thrust washer means and wherein the primary weight has a center of mass spaced from the driving lip and positioned on the opposite side of the pivot axis from the driving lip.

10. A drive pulley in accordance with claim 1, including a plurality of equally circumferentially spaced groups of primary and secondary weights.

11. A drive pulley in accordance with claim 10, wherein three groups of primary and secondary weights are provided and are substantially equally circumferentially spaced from each other.

12. A drive pulley in accordance with claim 10, including engagement means between the primary weight and the secondary weight and operable only during a low speed portion of the operating speed range of the drive shaft to cause the secondary weight to pivot with the primary weight.

13. A drive pulley in accordance with claim 12, wherein the engagement means includes a contact pin carried by the primary weight and a contact surface carried by the secondary weight.

14. A drive pulley in accordance with claim 1, including idler bearing means positioned between the first pulley wall and the second pulley wall, the idler bearing means including an outer race that is rotatable relative to the drive shaft and is adapted to be engaged by the inner surface of a drive belt when the first and second pulley walls are at their maximum axial spacing.

15. A drive pulley in accordance with claim 14, wherein the idler bearing means is a rolling contact bearing.

16. A drive pulley in accordance with claim 15, wherein the idler bearing means includes an inner race rotatable with the drive shaft, and an outer race positioned radially outwardly of the inner race and having a greater axial width in the direction of the drive shaft axis than the corresponding dimension of the inner race.

17. A drive pulley in accordance with claim 1, wherein the first pulley wall is carried by a fixed pulley face assembly that includes a fixed width drive pulley axially outwardly spaced along the drive shaft axis from the first pulley wall and is adapted to drivingly receive a drive belt.

18. A continuously variable power transmission for transmitting power from a driving shaft connected with a power source to a driven shaft, said transmission comprising:
 a. a driving pulley including a substantially V-shaped annular pulley slot defined by a movable pulley face and a fixed pulley face, the movable pulley face being movable axially toward and away from the fixed pulley face, centrifugal weight means including a primary weight and a secondary weight, the primary weight adapted to engage and move the movable pulley face axially toward the fixed pulley face as the rotational speed of the driving pulley is increased, and connection means for connecting the primary and secondary weights during an initial, low rotational speed range of operation of the driving pulley and for permitting movement of the primary weight alone above a predetermined driving pulley speed;
 b. a driven pulley including a fixed face and a movable face defining a substantially V-shaped annular pulley slot, the driven pulley including biasing means for biasing the movable face toward the fixed face; and
 c. a drive belt adapted to pass around the driving pulley and the driven pulley to transmit rotational energy from the driving pulley to the driven pulley.

19. A continuously variable transmission in accordance with claim 18, wherein the driving pulley includes a rolling contact idler bearing positioned between the fixed pulley face and the movable pulley face, the idler bearing including an outer race adapted to be contacted by the drive belt, to permit relative rotation between the drive belt and the drive shaft when the belt is in contact with the idler bearing.

* * * * *